United States Patent

[11] 3,603,280

[72] Inventor Emery J. Zahuranec
     Solon, Ohio
[21] Appl. No. 873,173
[22] Filed Nov. 3, 1969
[45] Patented Sept. 7, 1971
[73] Assignee Crawford Fitting Company

[54] TEMPERATURE SENSITIVE FITTING
     7 Claims, 4 Drawing Figs.
[52] U.S. Cl. .................................. 116/114.5,
     73/358, 116/106, 122/504.1, 122/504.3, 220/89
[51] Int. Cl. .................................. G01k 1/02
[50] Field of Search .......................... 116/106,
     112, 114.5, 117; 220/89 B; 73/358; 122/504.1,
     504.2, 504.3; 285/342

[56] References Cited
UNITED STATES PATENTS

| | | | |
|---|---|---|---|
| 394,102 | 12/1888 | Davis | 122/504.3 |
| 657,712 | 9/1900 | Thomas | 285/342 |
| 1,179,082 | 4/1916 | Drew | 122/504.3 |
| 1,237,957 | 8/1917 | Ray et al. | 122/504.2 |
| 1,293,730 | 2/1919 | Dornbrook | 122/504.1 |
| 1,922,625 | 8/1933 | Lovekin | 122/504.3 |
| 2,089,369 | 8/1937 | Heckert | 116/114.5 |
| 2,114,762 | 4/1938 | Edmonds | 116/114.5 UX |
| 2,277,533 | 3/1942 | Thompson | 220/89 |
| 2,431,110 | 11/1947 | Clair | 122/504.1 |
| 2,450,314 | 9/1948 | Vandervoort | 285/342 X |
| 2,862,732 | 12/1958 | Guillov | 285/342 |
| 3,103,373 | 9/1963 | Lennon et al. | 285/342 |

Primary Examiner—Louis J. Capozi
Attorney—Fay, Sharpe & Mulholland

ABSTRACT: A temperature sensitive fitting which is thermally connected to a component, has a fitting body with a bore therein opening at one end to a static pressure line. An alarm is operatively connected to the static pressure line and senses a drop in pressure therein. A second opening in the fitting body connects the bore with the atmosphere and contains a temperature sensitive fusible plug which is readily replaceable without disconnecting the fitting and the component to which it is attached. Overheating of the component causes the plug in the fitting to melt, and the resultant drop in the pressure line to actuate the alarm.

PATENTED SEP 7 1971

3,603,280

*INVENTOR.*
EMERY J. ZAHURANEC
BY
*Fay, Sharpe & Mulholland*
ATTORNEYS.

TEMPERATURE SENSITIVE FITTING

BACKGROUND OF THE INVENTION

Temperature sensitive fittings are often required where components must be protected against overheating. For example, bearings will fail if overheated. On vehicles such as railway trains failure of a bearing could result in a major breakdown. Similar considerations apply in respect of various chemical process equipment, instrumentation installations, and so on. Needless to say, early detection of unusually high temperatures in these critical applications is extremely important and highly desirable.

It is possible to monitor constantly the temperature of the component with an electrical sensing means such as a thermocouple. However, this procedure is more expensive, time consuming and inconvenient than necessary. Moreover, a constant temperature monitor is simply not required in many applications where, for example, it is only necessary to detect the temperature above a certain critical point where damage may occur to the component. In this respect, pneumatic alarm systems have been found to be quite satisfactory. The pneumatic systems are also particularly convenient where air pressure is readily available, such as on railway cars, and in most manufacturing installations.

In pneumatic systems having a pressurized static line connected to an alarm it is conventional to use a temperature sensitive fitting. The fitting usually has an internal passageway which is connected to one end of the pressurized static line. An opening in the fitting forms a passageway to the atmosphere but is blocked by a fusible melt-out plug. The fitting is normally threadedly engaged with, welded or otherwise mounted upon the critical component and thus thermally connected to it. Heat causing a temperature rise in the component is thus conducted to the fitting where an elevation in the temperature of that element is also produced. If the temperature rises above the melting temperature of the fusible plug, it liquifies and relieves the pressure in the fitting passage to the atmosphere. The pressure drop is sensed, and an alarm is actuated.

Once the problem which causes overheating is corrected the temperature sensitive plug must be replaced. Needless to say, it is highly desirable if the entire fitting can remain in position while the plug is reset. Conventionally, replacement has entailed separating the fitting and the component, obtaining a new fitting with a fusible plug and replacing the fitting in thermal contact with the component. The usual fitting thus was useful only in detecting one high temperature variation before it must be disassembled and replaced.

Because of the nature of some components which consistently overheat, it is inconvenient, expensive and time consuming to replace an entire temperature sensitive fitting after each cycle. Moreover, delays caused by downtime while the fitting is being replaced can be very costly due to the nature of the structure in which such components are used.

The present invention has substantially solved the problem of the prior art by providing a melt-out plug which is replaceable without removing the fitting with which it is associated.

SUMMARY OF THE INVENTION

This invention relates to a system for detecting high temperatures in a component. A fitting has one end threadedly engaged or otherwise connected in thermal transmitting relationship with a component to be protected against overheating. The fitting comprises a fitting body with a bore therein open at one end to a static fluid line. A second opening in the fitting body connects the bore with the atmosphere and is normally closed with a temperature sensitive melt-out plug. The melt-out plug is located solely in the fitting body and does not directly contact the component.

PREFERRED EMBODIMENTS

Figure 1:
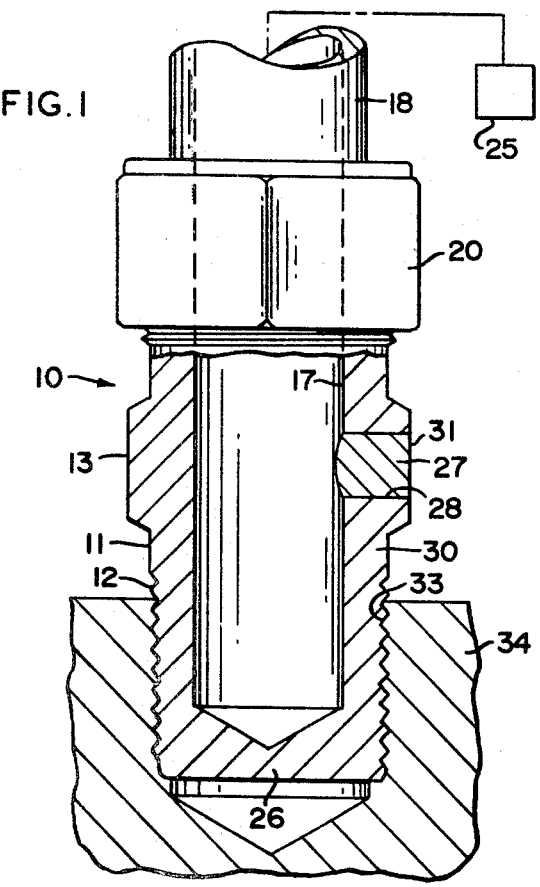
FIG. 1 is a side elevation, partially cut away, of one embodiment of the temperature sensitive fitting.

This invention, as illustrated in FIG. 1, includes a temperature sensitive fitting 10 made of a thermally conductive material such as brass, steel or the like, and having a fitting body 11. The fitting body 11 has external threads 12 at one end thereof and wrench pads 13 near the center of the fitting. Extending through a large portion of the length of the fitting is a bore 17 in fluid conducting communication with a static fluid pressure line 18 which is connected to the fitting by a suitable coupling 20. The static pressure line 18 is connected, as shown in schematic, to a pressure sensitive alarm 25. As used herein, the alarm 25 may be a pressure sensitive gauge or pressure transducer which transmits a signal to a light, horn or the like. Alarm 25 may give an audible or visual signal, or both, when the pressure in the static line 18 drops below a predetermined value. The lower end of the fitting is closed by end wall 26, thus insulating the pressure in the passageway 17 from the component 34.

A fusible plug 27 is positioned in an opening 28 which extends from the outer circumference of the fitting body 11 through the fitting body wall 30 to the bore 17. The melt-out plug 27 has an outer surface 31 which is generally flush with the wrench pad 13 as seen in FIG. 1.

The fitting 10 is engaged in thermally conductive relationship with a component 34. The component 34 is usually an element which is sensitive to high temperatures and can be substantially injured thereby. The connection of fitting 10 to component 34 has been illustrated as being by means of threads 33. However, it will be obvious that welding, brazing, or other suitable means may be used, so long as the means is capable of withstanding temperatures in excess of the maximum temperatures with which the fitting is to be used, and so long, further, as the means is capable of transmitting heat from component 34 to fitting body 11.

When the component 34 experiences a rise in temperature, the heat is transferred by means of conduction to the fitting body 11. As the fitting body 11 rises in temperature, it reaches the melting temperature of the fusible plug 27 which may be solder or some other metal with a relatively low melting point. As the fusible plug liquifies, the pressure in the opening 17 is released to the atmosphere, thus actuating the alarm 25.

Once corrective action has been taken to reduce the temperature of the component, a new melt-out plug may be introduced into the opening 28 by simply driving it in place, and without the necessity for disconnecting the fitting body 11 from the component 34.

Figure 2:
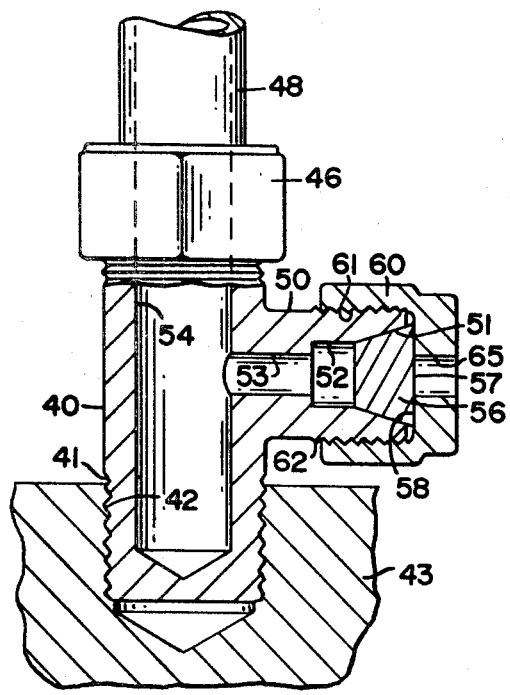
FIG. 2 is a side elevation, partially cut away, showing an alternate method of holding the melt-out plug in position in the fitting.

FIG. 2 shows a fitting body 40 with external threads 41 at one end engaged with the internal threads 42 of a component 43. Fitting body 40 is connected to static pressure line 48 by a suitable coupling 46. Line 48 is in turn connected to an alarm as previously discussed with respect to the embodiment of FIG. 1.

A radially outwardly extending branch 50 of the body 40 has an inwardly tapering frustoconical mouth 51 leading to a counterbore 52. A coaxial passageway 53 connects the counterbore 32 with a main bore 54. A melt-out plug 56 having a generally frustoconical outer surface is fitted in the mouth 51. The outer surface 57 of the plug 56 is engaged by a thrust surface 58 of coupling nut 60. The coupling nut 60 has internal threads 61 which threadedly engage external threads 62 on the extension 50. An aperture 65 at the rear of the coupling nut permits the plug 56, upon melting, to pass to the exterior of the fitting.

Once the melt-out plug 56 liquifies, replacement is simple and efficient. The nut 60 is removed, a new plug is inserted into mouth 51 and the nut 60 is replaced and tightened down.

Figure 3:
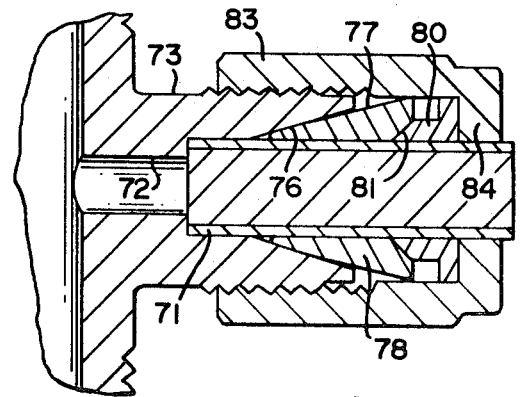
FIG. 3 is a fragmentary side elevation, partially cut away of another alternate embodiment of a temperature sensitive fitting.

An alternate type of melt-out plug is shown in FIG. 3. In that figure, a melt-out plug is placed in a tube 71 extending longitudinally from an opening 72 in branch 73. The tube 71 is generally cylindrical in shape and extends from the mouth of the opening 72 to a length greater than that of the branch 73. The branch has a frustoconical mouth 76 which is engaged by a tapered surface 77 of a front ferrule 78. A rear ferrule 80 engages a frustoconical surface 81 at the rear of the front ferrule, thus on rotation of the coupling nut 83 driving it into position and wedging it against the tube. Coupling nut 83 has an inwardly extending flange 84 and defines an aperture through which the tube 71 holding the melt-out plug passes. Exact details of the fitting shown in FIG. 3 may be seen in U.S. Pat. No. 3,103,373 to Lennon et al.

In the embodiment of FIG. 3 there is the distinct advantage that after the melt-out plug has melted due to high temperatures it is easy to replace. The coupling nut may simply be ferrules and tube removed and a new tube with a melt-out plug therein fastened in place using new ferrules and the original coupling nut. The whole process of replacing the melt-out plug requires only a few seconds. It is even possible that the plug alone may be replaced in the tube. In any event, the relationship between the fitting and the component need never be disturbed.

Figure 4:
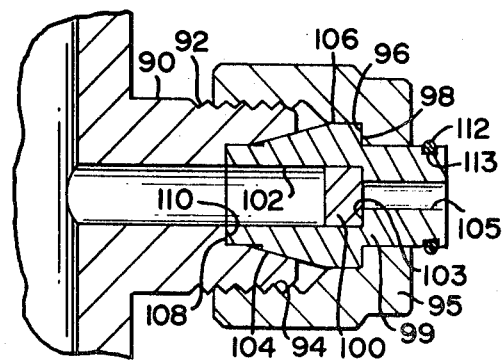
FIG. 4 is a fragmentary side elevation, partially cut away, of still another alternate embodiment of a temperature sensitive fitting.

FIG. 4 illustrates another embodiment of this invention, and also includes a readily replaceable melt-out plug. In this embodiment an outwardly extending branch 90 has external threads 92 which engage internal threads 94 on a coupling nut 95. A shoulder 96 on the coupling nut 95 engages a radially outwardly extending shoulder 98 on a casing 99. The casing 99 has a melt-out plug 100 closing internal longitudinal bore 102.

The longitudinal bore 102 has an internal radially extending shoulder 103 which leads to a smaller coaxial passage 105. The shoulder 103 acts as an abutment for the cylindrical plug 100. The presence of such an abutment guarantees that the plug will not be blown out of casing by the pressure therein. Moreover, the plug 100 will be easier to replace since the abutment also acts as a seat.

The outside of the casing 99 has a rearwardly and upwardly tapered surface 104 which terminates in a radial circumferential face 106. The shoulder 98 connects the face 106 with the rear of the casing 99. The front face 108 of the casing is located proximate an internal shoulder 110 in the branch 90 when the coupling nut 95 abuts against the shoulder 98 and pushes the casing forward.

A snap ring 112 or the like fits in a circumferential groove 113 near the rear of the casing 99. The ring 112 serves to maintain the casing 99 in the coupling nut 95 when it is unscrewed from the branch 90. The casing 99 and plug are thus removed from the fitting automatically with the coupling nut 95.

The invention claimed is:
1. A temperature sensitive fitting comprising:
a fitting body having a circumferential wall defining a bore therein;
a component;
means for thermally connecting the fitting body and the component whereby heat may be transferred by means of conduction from the component to the fitting;
a first opening in the fitting body connecting the bore to a pressure line;
a second opening in the fitting body connecting the bore to the atmosphere through the circumferential wall;
a fusible plug in the circumferential wall closing the second opening; and
means for holding the fusible plug in the fitting.

2. The temperature sensitive fitting of claim 1 wherein said means for holding includes a branch extending transversely from the fitting body in fluid communication with the second opening, and a coupling nut; the coupling nut being removably connected to the branch and having a radially inwardly directed flange which engages the rear of the fusible plug.

3. The temperature sensitive fitting of claim 1 wherein the means for holding includes a branch extending transversely from the body and in fluid communication with the second opening;
a coupling nut removably connected to the branch, and holding the fusible plug.

4. The temperature sensitive fitting of claim 3 wherein the branch has a frustoconically shaped mouth, a front ferrule having a tapered surface which is adapted to fit in the frustoconically shaped mouth, a rear ferrule having a frustoconical front surface to engage the rear section of the front ferrule; a coupling nut having a radially inwardly extending flange which engages the rear ferrule holding it in engagement with the front ferrule; and a fusible plug operatively held in position by the ferrules.

5. The temperature sensitive fitting of claim 3 wherein a tube is held by the nut and the fusible plug is positioned inside of the tube.

6. The temperature sensitive fitting of claim 3 wherein a casing holds the fusible plug and is positioned between the branch and the coupling nut; the casing having a tapered outer portion which fits into a tapered inner section of the branch,
a shoulder on the outer circumference of the casing and a complementary shoulder on the coupling nut, the coupling nut thereby forcing the casing into the branch.

7. The temperature sensitive fitting of claim 6 wherein the casing has an internal abutment against which the fusible plug rests.